United States Patent [19]

Mietzner et al.

[11] 4,048,411
[45] Sept. 13, 1977

[54] MANUFACTURE OF COPOLYMERS OF ETHYLENE

[75] Inventors: Franz Georg Mietzner, Ludwigshafen; Klaus Pfleger, Wesseling; Hans Gropper, Ludwigshafen; Oskar Buechner, Dudenhofen; Klaus Boettcher; Wieland Zacher, both of Wesseling, all of Germany

[73] Assignee: BASF Aktiengesellschaft, Ludwigshafen, (Rhine), Germany

[21] Appl. No.: 687,868

[22] Filed: May 19, 1976

[30] Foreign Application Priority Data

May 31, 1975  Germany ............................. 2524230

[51] Int. Cl.² .......................................... C08F 210/02
[52] U.S. Cl. ..................................... 526/64; 526/324; 526/329; 526/331; 528/501
[58] Field of Search ................. 526/64, 324, 329, 331

[56] References Cited

U.S. PATENT DOCUMENTS 3,551,397  12/1970  Ratzsch et al. ...................... 526/331

Primary Examiner—Harry Wong, Jr.
Attorney, Agent, or Firm—Keil, Thompson & Shurtleff

[57] ABSTRACT

A process for the manufacture of copolymers of ethylene with vinyl acetate at pressures above 800 atmospheres and at from 150° to 350° C, using mean residence times of up to at most 100 seconds. The reaction mixture obtained from the polymerization is kept for from 2 to 10 minutes at from 150° to 250° C under a pressure below 500 atmospheres. Homogeneous ethylene/vinyl acetate copolymers are obtained without the formation of substantial amounts of free acetic acid by decomposition of the vinyl acetate.

6 Claims, No Drawings

MANUFACTURE OF COPOLYMERS OF ETHYLENE

The present invention relates to a process for the manufacture of ethylene copolymers which contain up to 30 percent by weight of copolymerized vinyl acetate units.

In this process, ethylene and vinyl acetate are copolymerized at pressures above 800 atmospheres and at from 150° to 350° C, using mean residence times of up to at most 100 seconds.

The copolymers of ethylene and vinyl acetate manufactured by conventional processes are of unsatisfactory quality. Because they contain free acetic acid in amounts of up to 0.2 percent by weight, the copolymers are not odorless and, when processed, exhibit objectionable side-effects, e.g. corrosion of machine parts. These disadvantages also manifest themselves when manufacturing injection moldings or hollow articles. The finished articles in some cases exhibit enclosed gas bubbles or other defects. Furthermore, hollow articles made from products manufactured by conventional processes are limited in use; e.g., the odor of these products prevents their use in the cosmetic or foodstuff industry.

A further disadvantage of the conventional processes is that the free acetic acid produced during manufacture of the copolymers severely corrodes the materials of which the pipelines and vessels of the high pressure polymerization unit are constructed. Furthermore, the vinyl acetate left unconverted during the high pressure polymerization must, because of its high content of acetic acid, be subjected to expensive working up before it can be re-used in the polymerization process.

It is an object of the present invention to modify the process described above for the copolymerization of ethylene and vinyl acetate, so that ethylene/vinyl acetate copolymers which contain only very small amounts of free acetic acid are obtained. It is a further object of the present invention to produce as little free acetic acid as possible in the high pressure polymerization apparatus so that corrosion of the said apparatus is reduced to a minimum. It is yet a further object of the invention to make the unconverted vinyl acetate reusable in the polymerization process without expensive prior working-up.

We have found that these objects are achieved by a process wherein the reaction mixture, obtained from the polymerization, is passed, after leaving the reaction zone, through a cooling zone which is at a pressure below 500 atmospheres and at from 150° to 250° C, into the high pressure product isolation zone, which is immediately downstream from the cooling zone, the mean residence time of the reaction product in the two zones being from 2 to 10 minutes.

According to a preferred embodiment, the cooling zone and the high pressure product isolation zone immediately downstream therefrom are at from 200 to at most 235° C. In a further preferred embodiment, the temperature of the reaction mixture in the high pressure product isolation zone is kept constant to ± 2° C.

The copolymerization of ethylene with vinyl acetate is carried out in a tubular polymerization apparatus as conventionally used for continuous high pressure polymerization. It has proved particularly advantageous to carry out the high pressure polymerization process continuously. Regarding polymerization in tubular reaction apparatuses, reference may be made to Ullmann's Encyklopädie der techn. Chemie, 3rd edition, Verlag Urban & Schwarzenberg, Munich, — Berlin, 1963, Volume 14, pages 138 to 148. The ratio of the diameter of the reaction tube to the length of the tube is preferably 1 : 20,000. The reaction tube is usually surrounded by a jacketing tube which contains the heat transfer medium. The jacketing tube is divided into two zones which can be heated independently of one another, of which the first zone extends over two-fifths, and the second zone over the remaining three-fifths, of the length of the tube. At the end of the reaction tube, i.e. at the end of the reaction zone, there is a valve which serves to regulate the pressure in the polymerization space and also to discharge the reaction product into the cooling zone and into the high pressure product isolation zone downstream therefrom. The pressure in the reaction tube, in which the polymerization of the monomer mixture is carried out, is greater than 800 atmospheres. As a rule, the polymerization is carried out at pressures of up to 3,000 atmospheres, but pressures of up to 8,000 atmospheres can also be used. The temperature in the reaction zone is from 150° to 350° C and preferably from 280° to 320° C. The mean residence time, in the reaction zone, of the mixture to be polymerized is very short, being at most 100 seconds. This mean residence time is defined by the ratio of the volume of the apparatus to the mean volume of product passing through the volume of the apparatus per unit time.

The ethylene employed for the polymerization should be at least 98% pure. The vinyl acetate is commercially available. The copolymerization of ethylene with vinyl acetate can also be carried out in the presence of other compounds which are copolymerizable with ethylene and vinyl acetate to give terpolymers. In addition to vinyl acetate, other vinyl esters of saturated carboxylic acids, preferably of acids of 3 to 8 carbon atoms, may be used for the copolymerization, an example being vinyl propionate. The esters of acrylic acid, methacrylic acid, fumaric acid and maleic acid are suitable copolymerizable compounds for use in preparing terpolymers.

The ethylene is copolymerized with vinyl acetate in the presence of free radical initiators. For example, from 10 to 200 molar ppm of oxygen, based on ethylene, may be used, or peroxides or other compounds which form free radicals, or mixtures of such materials. tert.-Butyl peroxypivalate, di-tert.-butyl peroxide, tert.-butyl hydroperoxide, tert.-butyl perbenzoate, p-menthane hydroperoxide and dilauroyl peroxide may be mentioned as examples of peroxides. Compounds such as azoisobutyrodinitrile are also included under the term free radical polymerization initiators. The polymerization may be carried out in the presence of conventional polymerization regulators, e.g. hydrogen, ketones, alcohols, ethers or hydrocarbons, examples being propylene, methyl ethyl ketone and propionaldehyde. From 0.2 to 5 mole percent, based on ethylene, of the polymerization regulators are used. In general, the polymerization is carried out in the absence of a solvent. The small amounts of an inert solvent, e.g. benzene, in which the polymerization initiators are dissolved, are negligible compared to the other starting materials.

After the copolymerization of the ethylene with vinyl acetate in the reaction zone, the reaction mixture leaves the said zone at a temperature which is generally above 285° C and passes into a jacketed tube where it is cooled to from 150° to 250° C and preferably from 200° to 235° C. Simultaneously with this step, the reaction mixture is let down to pressures below 500 atmospheres. The cooled reaction mixture is then passed into a high pressure product isolation zone or high pressure separator, in which the pressure is the same as in the interior of the jacketed tube in the upstream cooling zone, i.e. less than 500 atmospheres. In this isolation zone, which is also at from 150° to 250° C and preferably from 200° to 235° C, the polymer formed in the reaction tube is separated from the non-polymerized monomers. The mean residence time of the reaction mixture, obtained after the polymerization, after having been cooled to from 150° to 250° is from 2 to 10 minutes. An essential feature is that the polymer formed should be brought to below 250° C as rapidly as possible after leaving the reaction zone. To achieve this, a cooling zone, consisting of a jacketed tube, is provided between the polymerization zone and the high pressure product isolation zone. It is also essential that in the high pressure product isolation zone all parts of the product, which remain in the zones for a total of from 2 to 10 minutes, should be at a constant temperature of from 150° to 250° C. For this purpose, the temperature in the high pressure product isolation zone is preferably kept constant to ± 2° C. From the high pressure product isolation zone the copolymer, which still contains small amounts of monomer, is passed into a subsequent low pressure separator in which the pressure is less than 10 atmospheres. From there, the copolymer is fed into an extruder. The non-polymerized monomers are recycled to the polymerization apparatus via a conventional separator system for separating off liquid materials. The unconverted vinyl acetate, separated off in a low temperature separator, is then re-employed in the polymerization process, without undergoing any prior treatment.

Surprisingly, the copolymerization can be carried out at above 280° C without the process of the invention leading to the formation of substantial amounts of free acetic acid by pyrolysis of the vinyl acetate or of the copolymerized vinyl acetate units. In contrast to the conventional processes, the process of the invention gives ethylene/vinyl acetate copolymers which contain only very small amounts of free acetic acid and can therefore be employed for all applications including injection molding. A further advantage of the process of the invention over conventional processes is that because of the low contents of acetic acid the high pressure polymerization apparatus suffers little corrosion due to acetic acid. Furthermore, because of its low content of free acetic acid, the unconverted vinyl acetate can, after having been separated off, be re-employed for the reaction without expensive prior treatments. A further advantage of the process is that very homogeneous copolymers are formed. The homogeneity of the products obtained by conventional processes is unsatisfactory, and this reduces the tensile strength and increases the speck count and the cloudiness of films.

The melt index of the ethylene/vinyl acetate copolymer manufactured according to the invention is from 0.1 to 50 g/10 mins (ASTM D 1238-65T at 190° C and 2.16 kg).

In the Example, parts are by weight.

EXAMPLE 1

A tubular reactor is fed with a mixture compressed to 2,100 atmospheres and consisting of 10,000 parts of ethylene, 1,250 parts of vinyl acetate and 14 molar ppm of oxygen, based on ethylene. During the polymerization, the heat transfer medium in the reactor jacket is kept at 190° C. As a result of the exothermicity of the reaction, the reaction mixture reaches a peak temperature of 305° C in the reaction zone. The mean residence time of the reaction mixture in the reaction zone is 50 seconds.

The polymer is cooled to 235° C under a pressure of 300 atmospheres in a cooled jacketed tube and is then fed into a high pressure separator which is downstream from the jacketed tube. The temperature in the high pressure separator is kept constant to ± 2° C; the mean residence time in the cooling zone and in the high pressure separator is 10 minutes.

An ethylene copolymer which contains 12.4 percent by weight of copolymerized vinyl acetate units is obtained. The free acetic acid content is 0.012 percent by weight (measured on the freshly granulated product). The ethylene/vinyl acetate copolymer has a melt index (190° C/2.16 kg) of 4.2 g/10 minutes and a density of 0.9328 g/cm$^3$ (measured according to DIN 53,479/7.2); it exhibits good homogeneity and gives films having good properties.

The content of free acetic acid in the high pressure circulation system of the reactor was 0.005 percent by weight. Analysis of the off-gas indicated a content of free acetic acid of less than 0.005 percent by weight. The content of free acetic acid in the unconverted vinyl acetate which has been separated off is 0.02%.

EXAMPLE 2

The procedure described in Example 1 is followed, but 10,000 parts of ethylene are copolymerized with 1,330 parts of vinyl acetate under a pressure of 2,300 atmospheres. As a result of the exothermicity of the reaction, the reaction mixture reaches peak temperatures of 315° C. The copolymer is cooled to 205° C in a jacketed tube under a pressure of 300 atmospheres and directly afterward is transferred to the high pressure separator. The product remains in this separator for 8 minutes at a constant temperature (± 2° C). An ethylene copolymer which contains 13.2 percent by weight of copolymerized vinyl acetate units is obtained. Analyses gave the following figures:

| | |
|---|---|
| melt index | 3.96 g /10 mins |
| density | 0.9338 g /cm$^3$ |
| free acetic acid in the high pressure circulation system | 0.005% |
| free acetic acid in the off-gas | <0.005% |
| free acetic acid in the recycled vinyl acetate | 0.015% |
| free acetic acid in the copolymer | 0.010% |

The copolymer obtained exhibits good homogeneity and gives films having good properties.

EXAMPLE 3

A mixture of 10,000 parts of ethylene, 245 parts of vinyl acetate and 12 molar ppm of oxygen, based on ethylene, is copolymerized under a pressure of 2,250 atmospheres, in the manner described in Example 1. The reaction mixture reaches a peak temperature of 310° C in the reaction zone. It is then cooled in a jacketed tube to 220° and fed into the high pressure separator, where it remains for 8 minutes.

The temperature in the high pressure separator is kept constant to ± 2° C. An ethylene copolymer which contains 2.4 percent by weight of copolymerized vinyl acetate units is obtained. Further analyses gave the following figures:

| | |
|---|---|
| melt index | 0.62 g / 10 mins |
| density | 0.9240 g / cm³ |
| free acetic acid in the high pressure circulation system | 0.005% |
| free acetic acid in the off-gas | <0.0005% |
| free acetic acid in the recycled vinyl acetate | 0.01% |
| free acetic acid in the copolymer | <0.005% |

The copolymer obtained exhibits good homogeneity and gives films having good properties.

COMPARATIVE EXAMPLE 1

A mixture of 10,000 parts of ethylene, 1,250 parts of vinyl acetate and 14 molar ppm of oxygen, based on ethylene, is copolymerized under a pressure of 2,100 atmospheres in the manner described in Example 1. The polymerization conditions are the same as those described for Example 1, with the exception that, as a modification of Example 1, the copolymer is not cooled and instead is transferred directly into a high pressure separator in which it remains for 8 minutes at a mean temperature of 285° C.

An ethylene copolymer which contains 11.3 percent by weight of copolymerized vinyl acetate units is obtained. Further analyses gave the following figures:

| | |
|---|---|
| melt index | 6.14 g/10 mins |
| density | 0.9309 g/cm³ |
| free acetic acid in the high pressure circulation system | 0.13% |
| free acetic acid in the off-gas | 0.06% |
| free acetic acid in the recycled vinyl acetate | 0.75% |
| free acetic acid in the copolymer | 0.075% |

The copolymer obtained is moderately homogeneous and gives films with moderate properties, which greatly limits its use.

COMPARATIVE EXAMPLE 2

A mixture of 10,000 parts of ethylene, 250 parts of vinyl acetate and 12 molar ppm of oxygen, based on ethylene, is fed to the tubular reactor, and polymerized under a pressure of 2,250 atmospheres, in the manner described in Example 1. The reaction conditions are the same as those described for Example 3, with one exception, namely that in contrast to Examples 1 – 3 the polymer is not cooled and instead is transferred directly into a high pressure separator in which it remains for 10 minutes at 290° C.

An ethylene copolymer which contains 2.1 percent by weight of copolymerized vinyl acetate units is obtained.

Further analytical results are:

| | |
|---|---|
| melt index | 0.70 g/10 mins |
| density | 0.9235 g/cm³ |
| free acetic acid in the high pressure circulation system | 0.11% |
| free acetic acid in the off-gas | 0.55% |
| free acetic acid in the recycled vinyl acetate | 0.70% |
| free acetic acid in the copolymer | 0.025% |

The copolymer obtained is moderately homogeneous and gives films with moderate properties, which greatly limits its use.

TABLE

| Example | Melt index (g/10 mins) of the copolymer | Density g/cm³ | Vinyl acetate % | Acetic acid in the copolymer % | Content of free acetic acid (%) | | |
|---|---|---|---|---|---|---|---|
| | | | | | in the high pressure circulation system | in the off-gas | in the recycled vinyl acetate |
| 1 | 4.2 | 0.9328 | 12.4 | 0.012 | 0.005 | <0.005 | 0.02 |
| 2 | 3.96 | 0.9338 | 13.2 | 0.010 | 0.005 | <0.005 | 0.015 |
| 3 | 0.62 | 0.9240 | 2.4 | <0.005 | 0.005 | <0.005 | 0.01 |
| Comparative Example | | | | | | | |
| 1 | 6.14 | 0.9309 | 11.3 | 0.075 | 0.13 | 0.06 | 0.75 |
| 2 | 0.70 | 0.9235 | 2.1 | 0.025 | 0.11 | 0.055 | 0.70 |

We claim:

1. A process for the manufacture of an ethylene copolymer which contains up to 30 percent by weight of copolymerized units of vinyl acetate by copolymerization of ethylene and vinyl acetate in a tubular reactor at pressures above 800 atmospheres and at from 150° to 350° C with a mean residence time of at most 100 seconds, wherein the reaction mixture obtained after the polymerization is passed, after leaving the reaction zone, through a cooling zone which is at a pressure below 500 atmospheres and at from 150° to 250° C, into a high-pressure product isolation zone which is immediately downstream from the cooling zone, the pressure in said isolation zone being the same as in said cooling zone, the mean residence time of the reaction product in the cooling zone and product isolation zone together being from 2 to 10 minutes.

2. A process as set forth in claim 1, wherein the temperature in the cooling zone and in the high-pressure product isolation zone which is immediately downstream therefrom is from 200° to 235° C.

3. A process as set forth in claim 2, wherein the temperature of the reaction mixture in the high-pressure product isolation zone is kept constant to ± 2° C.

4. A process as set forth in claim 1, wherein the copolymerization is carried out continuously in a tubular polymerization apparatus at a pressure of 800 to 300 atmospheres.

5. A process as set forth in claim 1, wherein copolymerization is carried out in the presence of an ester of acrylic, methacrylic, fumaric or maleic acid or a vinyl ester of a saturated carboxylic acid of 3 to 8 carbon atoms, whereby a terpolymer is produced.

6. A process as set forth in claim 1, wherein the copolymerization is carried out above 280° C.

* * * * *

UNITED STATES PATENT AND TRADEMARK OFFICE
CERTIFICATE OF CORRECTION

PATENT NO. : 4,048,411
DATED : September 13, 1977
INVENTOR(S) : MIETZNER ET AL

It is certified that error appears in the above-identified patent and that said Letters Patent are hereby corrected as shown below:

In claim 4, line 55 of column 6, delete "300" and substitute --3000--.

Signed and Sealed this

Nineteenth Day of June 1979

[SEAL]

Attest:

RUTH C. MASON
*Attesting Officer*

DONALD W. BANNER
*Commissioner of Patents and Trademarks*